United States Patent
Ootsuka

(10) Patent No.: US 12,151,327 B2
(45) Date of Patent: Nov. 26, 2024

(54) ROTARY TABLE DEVICE

(71) Applicant: JTEKT CORPORATION, Kariya (JP)

(72) Inventor: Yoshio Ootsuka, Ichinomiya (JP)

(73) Assignee: JTEKT CORPORATION, Kariya (JP)

( * ) Notice: Subject to any disclaimer, the term of this patent is extended or adjusted under 35 U.S.C. 154(b) by 261 days.

(21) Appl. No.: 17/646,730

(22) Filed: Jan. 3, 2022

(65) Prior Publication Data
US 2022/0226946 A1    Jul. 21, 2022

(30) Foreign Application Priority Data
Jan. 18, 2021  (JP) .................. 2021-005681

(51) Int. Cl.
*B23Q 1/52*  (2006.01)
(52) U.S. Cl.
CPC ....................... *B23Q 1/52* (2013.01)
(58) Field of Classification Search
CPC .......... B23Q 1/52; B23Q 1/522; B23Q 1/525; B23Q 3/068
See application file for complete search history.

(56) References Cited

U.S. PATENT DOCUMENTS

| | | | | |
|---|---|---|---|---|
| 3,772,961 A | * | 11/1973 | Siebert .................. | F16C 29/025 384/100 |
| 2008/0220922 A1 | * | 9/2008 | Katsuma .............. | B23Q 16/025 475/342 |
| 2010/0275726 A1 | * | 11/2010 | Tatsuda .................. | B23Q 1/287 74/813 R |
| 2010/0313708 A1 | | 12/2010 | Tatsuda | |

FOREIGN PATENT DOCUMENTS

| | | | |
|---|---|---|---|
| DE | 102019122040 A1 | * | 2/2020 |
| JP | 2002-018678 A | | 1/2002 |
| JP | 2007-290093 A | | 11/2007 |
| JP | 2008/050747 A1 | | 5/2008 |

(Continued)

OTHER PUBLICATIONS

USPTO Machine Translation (retrieved from FIT database) of the Description of JP 2014161995 A, Ogasawara, Sep. 8, 2014. (Year: 2023).*

(Continued)

*Primary Examiner* — Daniel D Yabut
(74) *Attorney, Agent, or Firm* — Oblon, McClelland, Maier & Neustadt, L.L.P.

(57) ABSTRACT

There is provided a rotary table device including: a rotary table; a center shaft erected toward the rotary table; a housing including an inner peripheral surface having a circular cross section over a predetermined range along a rotation axis; a center sleeve including an outer peripheral surface having a circular cross section corresponding to the inner peripheral surface, and the outer peripheral surface being concentric with the inner peripheral surface; a plurality of recesses formed in at least one of the inner circumferential surface and the outer circumferential surface; a plurality of O-rings disposed to be sandwiched between the inner peripheral surface and the outer peripheral surface; an in-housing fluid flow path formed inside the housing; and a plurality of in-sleeve fluid flow paths formed inside the center sleeve.

6 Claims, 4 Drawing Sheets

(56) References Cited

FOREIGN PATENT DOCUMENTS

| | | |
|---|---|---|
| JP | 2010-125559 A | 6/2010 |
| JP | 2012-161863 A | 8/2012 |
| JP | 2014-161995 A | 9/2014 |
| KR | 100217938 B1 * | 9/1999 |
| KR | 101655702 B1 * | 9/2016 |

OTHER PUBLICATIONS

Office Action issued Jul. 16, 2024 in Japanese Patent Application No. 2021-005681 (with machine English translation).
Information Offer filed on Jun. 12, 2024 in Japanese Application No. 2021-005681 (with computer generated English translation).

* cited by examiner

ROTARY TABLE DEVICE

CROSS-REFERENCE TO RELATED APPLICATIONS

This application is based on and claims priority under 35 USC 119 from Japanese Patent Application No. 2021-005681 filed on Jan. 18, 2021, the contents of which are incorporated herein by reference.

TECHNICAL FIELD

The present disclosure relates to a rotary table device.

BACKGROUND ART

There is known a rotary table device that includes a distributor and distributes with the distributor a fluid such as air or oil to a rotary table that fixes a workpiece or a device for processing a workpiece (for example, JP2014-161995A). The distributor includes a fixed center sleeve, a center shaft that rotates relative to the center sleeve, a plurality of annular recesses axially provided on an inner periphery of the center sleeve, a first path hole that radially communicates with the recesses on an outer diameter side, and a second path hole that radially communicates with the recesses on an inner diameter side. In the rotary table device, the fluid flows from a fluid flow path provided in the center sleeve into the recesses through the first path hole, and is supplied to a fluid flow path formed in the center shaft through the second path hole. The center shaft is connected to the table, and the fluid supplied to the fluid flow path in the center shaft is fed to the table to drive a device on the table such as a chuck device. Examples of the fluid include liquid such as oil and coolant, and gas such as air. To prevent fluid leakage between the plurality of recesses on a boundary surface between the center sleeve and the center shaft, O-rings are provided on two sides of each of the recesses in the axial direction.

SUMMARY OF INVENTION

However, when the amount of air or oil distributed by the distributor increases, the number of recesses increases, and the number of O-rings also increases. When the number of O-rings increases, dynamic resistance due to the O-rings increases during rotation of the center shaft. When the center shaft rotates, the center sleeve is twisted by the dynamic resistance. Although not described in JP2014-161995A, when an encoder for detecting rotation of the rotary table is provided between the center sleeve and the center shaft on one end side in the axial direction, a rotation non-detection zone of the encoder is generated due to the twist of the center sleeve, and a lost motion of the rotary table occurs. As a result, it is expected that rotation control performance and rotation positioning accuracy deteriorate. Therefore, there is a demand for a configuration that prevents deterioration in the rotation control performance and the rotation positioning accuracy due to dynamic resistance of the O-rings.

The present disclosure can be implemented in the following aspects.

According to a first aspect of the present disclosure, a rotary table device includes: a rotary table; a case supporting the rotary table rotatably around a rotation axis; a center shaft erected toward the rotary table in a position of the case corresponding to the rotation axis; a housing fixed to the case and spaced apart from the center shaft to surround the center shaft, the housing including an inner peripheral surface having a circular cross section over a predetermined range along the rotation axis; a center sleeve disposed outside the center shaft and inside the housing, the center sleeve being fixed to the rotary table, the center sleeve including an outer peripheral surface having a circular cross section corresponding to the inner peripheral surface, and the outer peripheral surface being configured to rotate concentrically with the inner peripheral surface; a rotary encoder disposed on the center shaft and the rotary table, the rotary encoder being configured to detect a rotation angle of the rotary table; a plurality of recesses formed in at least one of the inner circumferential surface and the outer circumferential surface to form a flow path of a fluid; a plurality of O-rings disposed to be sandwiched between the inner peripheral surface and the outer peripheral surface to prevent a leakage of the fluid from the plurality of recesses; an in-housing fluid flow path formed inside the housing and each communicating with the plurality of recesses; and a plurality of in-sleeve fluid flow paths formed inside the center sleeve and each communicating with the plurality of recesses to supply the fluid into the flow path provided in the rotary table. According to the rotary table device of the first aspect, even when the rotary table and the center sleeve rotate relative to the housing and dynamic resistance of the O-rings is generated between the center sleeve and the housing, the center shaft is not affected by the dynamic resistance of the O-rings since no O-ring is provided between the center sleeve and the center shaft. As a result, neither a rotation non-detection zone of the encoder provided on the center shaft occurs nor a lost motion of the rotary table occurs. As a result, it is possible to prevent deterioration of rotation control performance and rotation positioning accuracy due to the dynamic resistance of the O-rings.

According to a second aspect of present disclosure, the plurality of recesses may have an annular groove shape. According to the rotary table device of the second aspect, the recesses each have an annular groove shape, and thus the fluid can be stably supplied from the housing to the center sleeve regardless of a rotation position of the center sleeve.

According to a third aspect of present disclosure, the plurality of recesses may be formed on the inner circumferential surface of the housing. According to the rotary table device of the third aspect, no recess is provided in the center sleeve, and thus the thickness of the center sleeve can be reduced.

According to a fourth aspect of present disclosure, the rotary table device may further include: a rotary support portion arranged between the center shaft and the center sleeve. According to the rotary table device of the fourth aspect, a distance between the center shaft and the center sleeve is kept constant, and the center sleeve can be prevented from being misaligned.

According to a fifth aspect of the present disclosure, the rotary support portion may include a bearing device or a dry bush. According to the rotary table device of the fifth aspect, friction between the center shaft and the center sleeve can be reduced.

The present disclosure can also be implemented in various forms other than the rotary table device. For example, the present disclosure can be implemented in a form of a machining device, a machining center, or the like.

DESCRIPTION OF EMBODIMENTS

First Embodiment

Figure 1:
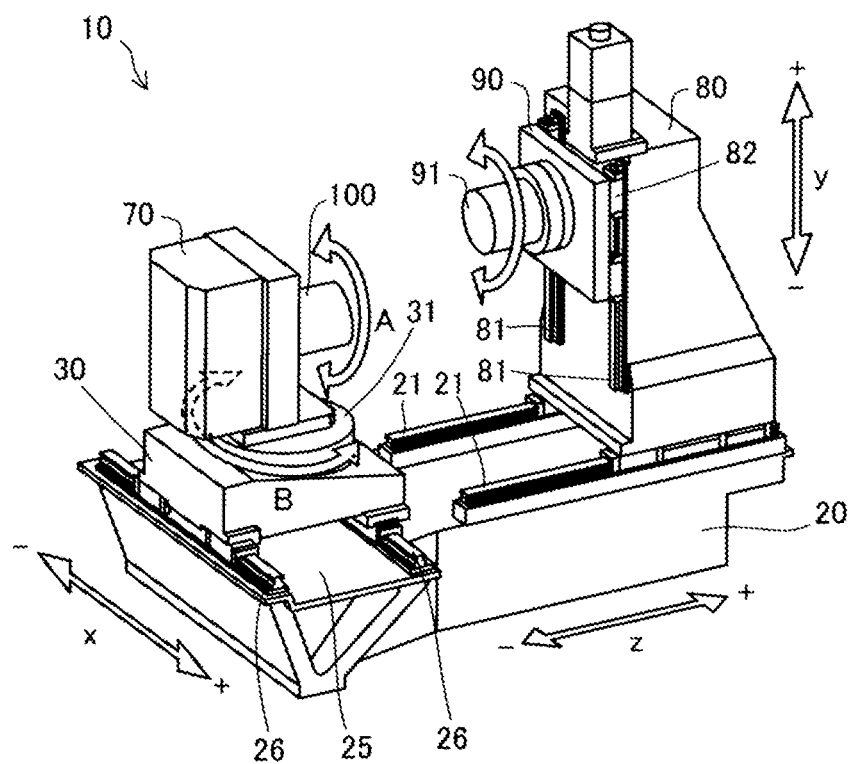
FIG. 1 is a schematic view of a five-axis machining center including a rotary table device.

FIG. 1 is a schematic view of a five-axis machining center 10 including a rotary table device 30. The five-axis machining center 10 includes a bed 20, the rotary table device 30, a turning spindle 70 including a chuck device, a column 80, and a saddle 90. The five-axis machining center 10 is of a horizontal type, in which a vertical direction is referred to as a y-axis direction, and horizontal directions intersecting the y-axis direction are referred to as an x-axis direction and a z-axis direction.

The bed 20 includes a pair of rails 21 extending along the z-axis, and a work table 25 extending in the −z direction of the rails 21. The work table 25 is provided with a pair of rails 26 extending along the x-axis. The rotary table device 30 is disposed above the rails 26. The rotary table device 30 is movable along the x-axis above the rails 26 by a servo motor (not illustrated).

The rotary table device 30 includes a rotary table 31 rotatable around a B-axis. The turning spindle 70 including a chuck device is disposed above the rotary table 31. The turning spindle 70 is also referred to as a turning main shaft. The turning spindle 70 can grip a workpiece 100 and rotate the workpiece 100 around an A-axis by a motor (not illustrated). A force used for gripping the workpiece 100 is provided by hydraulic pressure supplied via the rotary table device 30. A supply route thereof will be described later.

The column 80 is disposed above the rails 21 and is movable along the z-axis above the rails 21 by a servo motor (not illustrated). The column 80 is provided with a pair of rails 81 extending along the y-axis. The saddle 90 is disposed above the rails 81. The saddle 90 is movable along the y-axis above the rails 81 by a servo motor 82. The saddle 90 is provided with a spindle 91 to which a tool for machining a workpiece is attached. The spindle 91 is also referred to as a main shaft. When a motor (not illustrated) rotates the spindle 91, the tool rotates and processes the workpiece 100. When a skiving tool is used as the tool, the rotation of the tool and the rotation of the workpiece 100 are linked, and a tooth surface of the workpiece 100 is skived when the tool is moved in the axial direction relative to the workpiece 100. By using the rotary table device 30, the machining accuracy of the tooth surface is improved.

Figure 2:
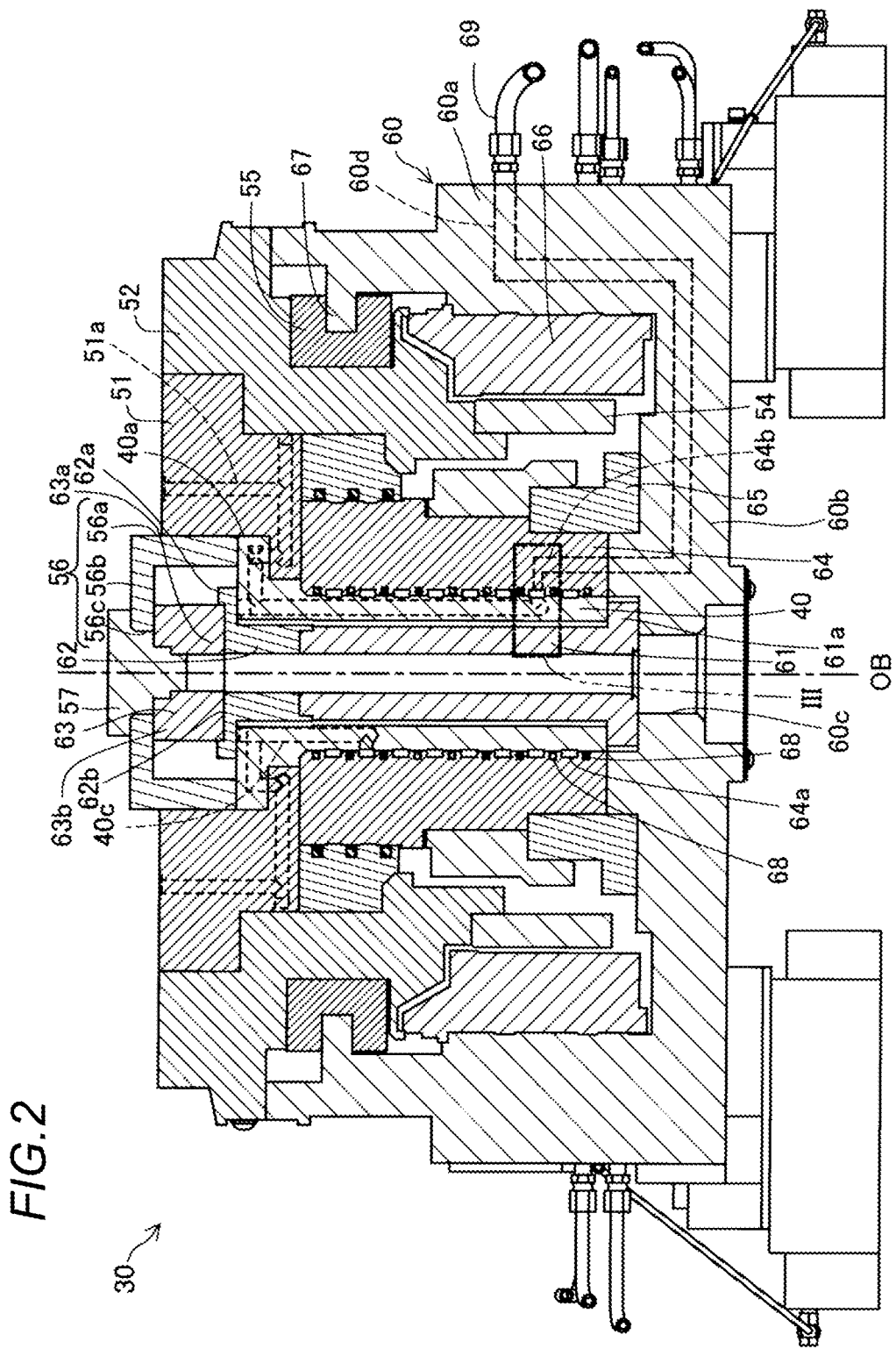
FIG. 2 is a schematic view of a configuration of the rotary table device.

FIG. 2 is a schematic view of a configuration of the rotary table device 30. The rotary table device 30 includes rotary components that rotate and stationary components that do not rotate. The rotary table device 30 includes, as the rotary components, the rotary table 31 (see FIG. 1, not illustrated in FIG. 2), a center sleeve 40, a first rotor 51, a second rotor 52, a rotor magnet 54 of a built-in motor, an inner ring 55 of a rolling bearing, a first coupling portion 56 that couples the center sleeve 40 with a second coupling portion 57, the second coupling portion 57, and a rotor portion 63a inside an encoder. The rotary table device 30 further includes, as the stationary components, a case 60, a center shaft 61, an encoder mounting portion 62 that couples the center shaft 61 with a casing 63b, the casing 63b on an outer diameter side of the encoder, a housing 64, a housing support portion 65, a stator coil 66 of the built-in motor, and an outer ring 67 of the rolling bearing.

The case 60 includes a disk portion 60b serving as a bottom surface of the rotary table device 30 and a cylindrical portion 60a rising from an outer periphery of the disk portion 60b. Here, the disk portion 60b side is referred to as "lower", and a direction in which the cylindrical portion 60a rises is referred to as "upper". The disk portion 60b has an opening 60c in the center. A cable and other signal lines (not illustrated) for sending an output from the casing 63b on the outer diameter side of the encoder to an external control device (not illustrated) pass through the opening 60c. A B-axis OB, which is the center of the case 60, passes through the center of the opening 60c. The B-axis OB is a rotation axis of the rotary table 31. The center shaft 61 having a cylindrical shape with the B-axis OB as a center axis is erected on the disk portion 60b. A fixing portion 61a having a flange shape is formed at a lower end of the center shaft 61. The fixing portion 61a is fixed to the disk portion 60b of the case 60 by a screw (not illustrated). In FIG. 2, screws for fixing members are not illustrated. The encoder mounting portion 62 is fixed to the center shaft 61 by a screw on a side (upper side in FIG. 2) of the center shaft 61 opposite to the disk portion 60b. The encoder mounting portion 62 has a cylindrical shape and includes a flange 62a on a side opposite to the center shaft 61. A central portion 62b of the flange 62a on the side opposite to the center shaft 61 is recessed, and the casing 63b on the outer diameter side of the encoder is fixed to the recessed central portion 62b by a screw. The casing 63b on the outer diameter side of the encoder has a cylindrical shape. The rotor portion 63a rotates integrally with the rotary table 31. The rotor portion 63a and the casing 63b are provided in a rotary encoder 63 that detects a rotation angle of the rotary table 31. In the present embodiment, a magnetic or optical rotary encoder can be used as the rotary encoder.

The center sleeve 40, which is a rotary component, is disposed outside the center shaft 61 with a slight gap therebetween. The center sleeve 40 has a cylindrical shape concentric with the B-axis OB. The center sleeve 40 includes a flange 40a on a side opposite to the case 60. The cylindrical first rotor 51, which is concentric with the B-axis OB, is disposed on an outer periphery of the flange 40a. The cylindrical second rotor 52, which is concentric with the B-axis OB, is disposed on an outer peripheral side of the first rotor 51. The rotor magnet 54 is disposed on the case 60 side of the second rotor 52. The built-in motor which is a direct drive motor includes the rotor magnet 54 and the stator coil 66 that is a stationary component. The inner ring 55 of the rolling bearing is disposed on an outer periphery of the second rotor 52. A three-way bearing includes the inner ring 55 of the rolling bearing and the outer ring 67 of the rolling bearing that is a stationary component, and the three-way bearing supports vertically and radially the outer ring 67. The first coupling portion 56 is fixed with a screw on a side of the flange 40a opposite to the case 60. The first coupling portion 56 includes a cylindrical portion 56a concentric with the B-axis OB, and a disk portion 56b formed with a hole 56c at a central portion of the cylindrical portion 56a on the rotary table 31 side (upper side in FIG. 2). The second coupling portion 57 is fitted into and fixed to the hole 56c.

The center sleeve 40 has an outer peripheral surface having a circular cross section, and the housing 64 is disposed outside the outer peripheral surface with a slight gap therebetween. The housing 64 is fixed to the case 60 by a screw. That is, the center sleeve 40 and the housing 64 are spaced apart from each other. The housing 64 has a cylindrical shape concentric with the B-axis OB. The housing support portion 65 is disposed on an outer peripheral side of the housing 64, and is fixed to the case 60 by a screw. The housing support portion 65 supports the housing 64 from the outer peripheral side.

The stator coil 66 is disposed inside the cylindrical portion 60a of the case 60. As described above, the stator coil 66 is included in the direct drive motor together with the rotor magnet 54.

The housing 64 has an inner peripheral surface having a circular cross section over a predetermined range along the B-axis OB. A plurality of recesses 64a each having an annular groove shape are formed on the inner peripheral surface. Between the inner peripheral surface of the housing 64 and the outer peripheral surface of the center sleeve 40, O-rings 68 are disposed above and below each of the recesses 64a in a direction along the B-axis OB. The O-rings 68 are sandwiched between the inner circumferential surface of the housing 64 and the outer circumferential surface of the center sleeve 40, and prevent leakage of a fluid supplied to the recesses 64a. The O-rings 68 generate dynamic resistance when the center sleeve 40 rotates, and thus the number of the O-rings 68 is preferably small. Here, since the O-rings 68 can be shared by two adjacent recesses 64a, the number of the O-rings 68 may be "n+1" pieces if the number of the recesses 64a is "n" pieces. The plurality of recesses 64a and a plurality of in-housing fluid flow paths 64b respectively communicating thereto are formed inside the housing 64. Each of the fluid paths 64b includes a radial path hole communicating with the corresponding recess 64a, and an axially extending passage.

A plurality of in-case fluid flow paths 60d are formed in the cylindrical portion 60a and the disk portion 60b of the case 60, and are respectively connected to the plurality of in-housing fluid flow paths 64b of the housing 64. Fluid supply pipes 69 respectively connected to the plurality of in-case fluid flow paths 60d are connected to the cylindrical portion 60a and the disk portion 60b.

Inside the center sleeve 40, a plurality of in-sleeve fluid flow paths 40c are respectively connected to the plurality of recesses 64a. Each of the fluid flow paths 40c includes a radial path hole communicating with the corresponding recess 64a and an axially extending passage. The in-sleeve fluid flow paths 40c are connected to fluid flow paths (not illustrated) of the rotary table 31 via a plurality of in-rotor fluid flow paths 51a formed inside the first rotor 51. The fluid flow paths of the rotary table 31 are connected to the turning spindle 70 including a chuck device via a tube (not illustrated). The housing 64 and the center sleeve 40 serves as a so-called distributor that distributes a fluid. The number of the recesses 64a is the distribution number of the distributor.

Figure 3:
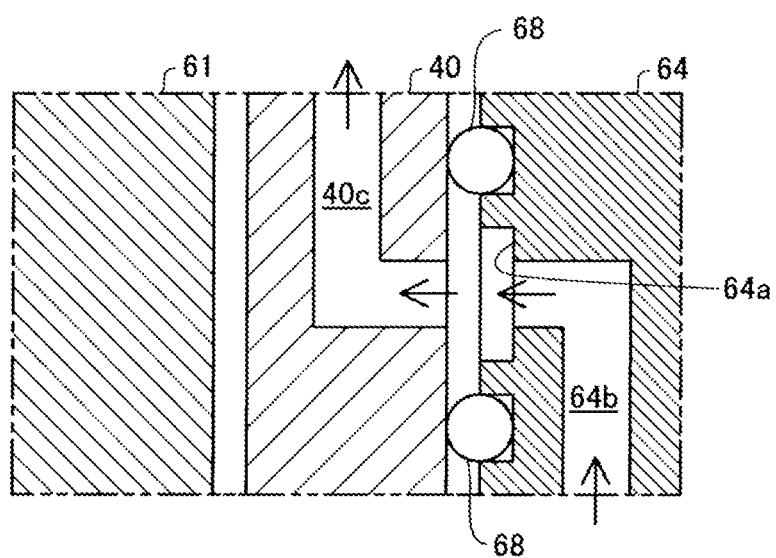
FIG. 3 is an enlarged view of a region III in FIG. 2.

FIG. 3 is an enlarged view of a region III in FIG. 2. As indicated by arrows, the fluid is supplied from the fluid flow path 64b formed in the housing 64 to a space defined by the recess 64a, the center sleeve 40, and two O-rings, and is further supplied to the fluid flow path 40c formed in the center sleeve 40. The O-rings 68 prevent leakage of the fluid in the vertical direction.

In the present embodiment, no O-ring is provided between the center shaft 61, to which the encoder 63 is coupled at one end in the axial direction, and the center sleeve 40, and the O-rings are disposed between the center sleeve 40 and the housing 64. Therefore, even if dynamic resistance is generated in the O-rings 68 between the center sleeve 40 and the housing 64 when the center sleeve 40 rotates, the dynamic resistance does not act on the center shaft 61, so that the center shaft 61 would not be twisted. As a result, neither a rotation non-detection zone of the encoder 63 nor a lost motion of the rotary table 31 occurs.

In the above embodiment, the recesses 64a are formed in the housing 64. Alternatively, the recesses may be formed in the center sleeve 40, or be formed in both the housing 64 and the center sleeve 40. That is, the recesses may be formed in at least one of the housing 64 and the center sleeve 40. When the recesses 64a are formed in the housing 64, the thickness of the center sleeve 40 can be reduced.

When the recesses 64a each have an annular groove shape, the fluid can be stably supplied from the housing 64 to the center sleeve 40 regardless of a rotation position of the center sleeve 40.

Second Embodiment

Figure 4:
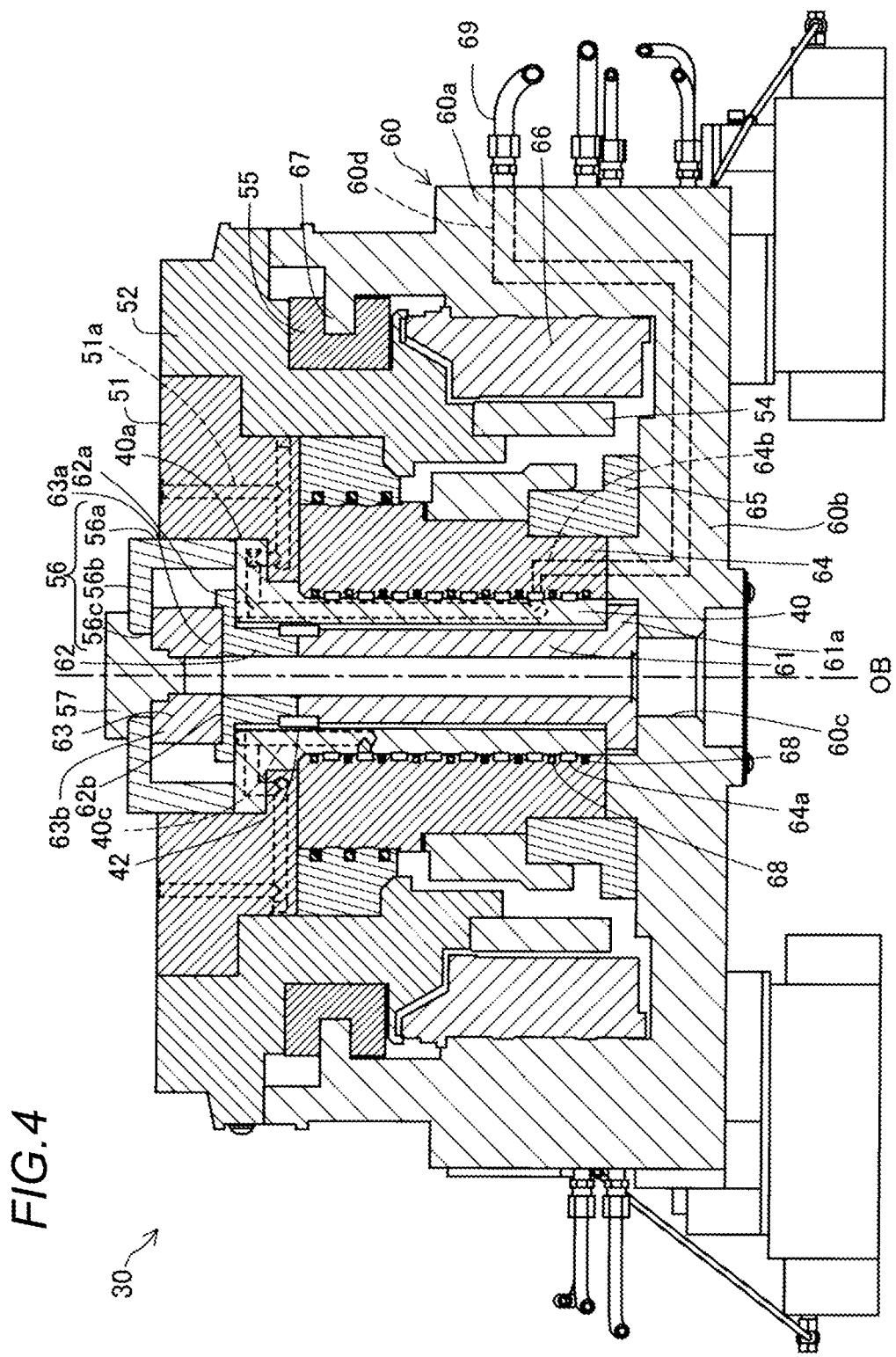
FIG. 4 is a schematic view of a configuration of a rotary table device according to a second embodiment.

FIG. 4 is a schematic view of a rotary table device according to a second embodiment. In the first embodiment, a slight gap is provided between the center sleeve 40 and the center shaft 61. In the second embodiment, a rotary support portion 42 is disposed in the gap. A distance between the center shaft 61 and the center sleeve 40 is kept constant, and the center sleeve 40 can be prevented from being misaligned. Examples of the rotary support portion 42 include a bearing device such as a roller bearing, or a dry bush.

The present disclosure is not limited to the above-described embodiments, and can be implemented by various configurations without departing from the gist of the present disclosure. For example, the technical features in the embodiments corresponding to the technical features in the aspects described in the summary may be replaced or combined as appropriate to solve a part or all of the above-described problems or to achieve a part or all of the above-described effects. One of the technical features may be omitted as appropriate unless described as essential in the present specification.

What is claimed is:

1. A rotary table device comprising:
   a rotary table;
   a case supporting the rotary table rotatably around a rotation axis;
   a center shaft erected toward the rotary table in a position of the case corresponding to the rotation axis;
   a housing fixed to the case and spaced apart from the center shaft to surround the center shaft, the housing including an inner peripheral surface having a circular cross section over a predetermined range along the rotation axis;
   a center sleeve disposed outside the center shaft and inside the housing, the center sleeve being fixed to the rotary table, the center sleeve including an outer peripheral surface having a circular cross section corresponding to the inner peripheral surface, and the outer peripheral surface being configured to rotate concentrically with the inner peripheral surface;
   a rotary encoder disposed on the center shaft and the rotary table, the rotary encoder being configured to detect a rotation angle of the rotary table;
   a plurality of recesses formed in at least one of the inner peripheral surface and the outer peripheral surface to form a flow path of a fluid;
   a plurality of O-rings disposed to be sandwiched between the inner peripheral surface and the outer peripheral surface to prevent a leakage of the fluid from the plurality of recesses;

an in-housing fluid flow path formed inside the housing and each communicating with the plurality of recesses;

a plurality of in-sleeve fluid flow paths formed inside the center sleeve and each communicating with the plurality of recesses to supply the fluid into the flow path provided in the rotary table; and a gap is formed between an outer surface of the center shaft and an inner surface of the center sleeve along an entire length of the center sleeve.

2. The rotary table device according to claim 1, wherein the plurality of recesses have an annular groove shape.

3. The rotary table device according to claim 1, wherein the plurality of recesses are formed on the inner peripheral surface of the housing.

4. The rotary table device according to claim 1, further comprising:

a rotary support portion arranged between the center shaft and the center sleeve.

5. The rotary table device according to claim 4, wherein the rotary support portion includes a bearing device or a dry bush.

6. The rotary table device according to claim 1, wherein no seals are disposed in the gap between the center shaft and the center sleeve.

* * * * *